Patented July 4, 1939

2,164,952

UNITED STATES PATENT OFFICE 2,164,952

PROCESS OF PURIFYING AND DISPERSING COLORING MATTER OF THE ANTHRAQUINONE SERIES

Karl Josef Schwing, East Orange, N. J.

No Drawing. Application May 12, 1938,
Serial No. 207,503

2 Claims. (Cl. 260—379)

The present invention relates to the purification and dispersion of N-substitution products of polyaminoanthraquinones, which have at least one of the hydrogenes of one or more of the amino groups substituted by a member of the group consisting of —CH$_2$CH$_2$OH
—CH$_2$CH$_2$CH$_2$OH and CH$_2$CH$_2$CH$_2$CH$_2$OH.

Such products are described in U. S. Patents #2,051,004, Examples 4, 12 and 61 and #1,980,025, Examples 1, 2 and 8.

It is a common observation, that such products, if produced by either condensing leuco 1-4-diaminoanthraquinone of leuco-quinizarine with corresponding mixtures of alkylamines and ethanolamines, followed by oxidation, yield in addition to the dye, by-products having no dye value.

I have found, that these by-products can be removed in a suitable manner, and at the same time the color be brought into an extreme fine state of dispersion, by taking advantage of the high solubility of these ethanol, propanol and butanol-aminoanthraquinones in water solutions of hydrochloric acid.

The following procedure describes the process of purification as well as dispersion:

Ten parts of the crude dye are added under agitation to one hundred parts of a 10% hydrochloric acid solution. To speed up the solution of the dye, the whole is heated to 50–60° C. for ½–1 hour. The dissolved color is filtered from insoluble by-products and the purple color liquor is neutralized with caustic soda solution, whereby the color precipitates in a fine amorphous form. Stronger as well as weaker concentrations of hydrochloric acid can be used.

The usual method of bringing anthraquinone derivatives into fine form is by dissolving them in conc. sulfuric acid and quenching the acid solution in large quantities of water.

This general method cannot be used in the case of the products mentioned in this application due to the fact, that even under mild conditions sulfuric acid esters are being formed, which make the color unsuitable for its use as acetate silk color. Hydrochloric acid does not produce an ester, but forms the water soluble hydrochloride of the color base, which is easily decomposed with caustic soda.

As specific compounds which thus can be purified and dispersed I mention the following:

1 - methylamino - 4 - ethanolaminoanthraquinone; 1,4 - diethanolaminoanthraquinone; 1 - ethylamino - 4 - butanolaminoanthraquinone; 1 - methylamino - 4 - propanolaminoanthraquinone; 1 - methylamino - 4 - butanolaminoanthraquinone; 1 - methylamino - 4 - ethanolamino - 5,8-diaminoanthraquinone.

The methylamino group may be substituted by other primary amines.

What I claim is:

1. A process of purifying polyaminoanthraquinones having at least one amino-group replaced by a member of the group consisting of —NHCH$_2$CH$_2$OH, —NHCH$_2$CH$_2$CH$_2$OH and
—NHCH$_2$CH$_2$CH$_2$CH$_2$OH, which process consists in dissolving the anthraquinone compound in water solutions of hydrochloric acid, filtering the solution from insoluble byproducts and neutralizing the solution with caustic soda, whereby the colorbase precipitates out in a fine form.

2. A process of bringing polyaminoanthraquinones, having at least one amino-group replaced by a member of the group consisting of —NHCH$_2$CH$_2$OH, —NHCH$_2$CH$_2$CH$_2$OH and
—NHCH$_2$CH$_2$CH$_2$CH$_2$OH, into fine dispersion by dissolving them in water solutions of hydrochloric acid, and after solution has been accomplished, neutralizing the acid with caustic soda, whereby the colorbase precipitates out in a fine form, well suitable for making dispersed powders.

KARL JOSEF SCHWING.